US009043725B2

(12) United States Patent
Wakefield et al.

(10) Patent No.: US 9,043,725 B2
(45) Date of Patent: May 26, 2015

(54) USER INTERFACE WITH ENLARGED ICON DISPLAY OF KEY FUNCTION

(75) Inventors: Ivan Nelson Wakefield, Cary, NC (US); Frank Gilliam Perry, III, Raleigh, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 2432 days.

(21) Appl. No.: 11/829,145

(22) Filed: Jul. 27, 2007

(65) Prior Publication Data
US 2009/0027347 A1    Jan. 29, 2009

(51) Int. Cl.
*G06F 3/02* (2006.01)
*H04M 1/725* (2006.01)
*G06F 3/0489* (2013.01)
*H04M 1/23* (2006.01)

(52) U.S. Cl.
CPC .......... *H04M 1/7258* (2013.01); *G06F 3/0202* (2013.01); *G06F 3/0219* (2013.01); *G06F 3/0489* (2013.01); *H04M 1/23* (2013.01); *H04M 1/72558* (2013.01); *H04M 1/72588* (2013.01); *H04M 2250/22* (2013.01); *H04M 2250/56* (2013.01)

(58) Field of Classification Search
USPC .......... 345/156–178; 715/700, 788, 810, 812, 715/823.835, 838; 455/566; 341/33
See application file for complete search history.

(56) References Cited

U.S. PATENT DOCUMENTS

| 6,125,029 | A | * | 9/2000 | Sasaki et al. ............. 361/679.28 |
| 2002/0057259 | A1 | | 5/2002 | Suzuki |
| 2004/0056895 | A1 | * | 3/2004 | Hedrick ........................ 345/764 |
| 2007/0115263 | A1 | | 5/2007 | Taylor et al. |
| 2007/0205991 | A1 | | 9/2007 | Gloyd et al. |

FOREIGN PATENT DOCUMENTS

| EP | 1 764 987 | 3/2007 |
| JP | 2002-149308 | 5/2002 |
| JP | 2005-352924 | 12/2005 |

OTHER PUBLICATIONS

International Search Report and Written Opinion for corresponding Application No. PCT/US2008/051131 dated Jun. 10, 2008.

(Continued)

*Primary Examiner* — Charles V Hicks
*Assistant Examiner* — Jeffrey S Steinberg
(74) *Attorney, Agent, or Firm* — Renner, Otto, Boisselle & Sklar, LLP

(57) ABSTRACT

To improve the consumer experience with portable electronic devices, a user interface combines the use of capacitive sensors with tactile sensors in an input device. When a user places a finger, stylus, or other input instrument near a given key button, a capacitive sensor causes the display to display temporarily an indication of the function of that key in an enlarged format. The user may then press the associated key button to activate the desired function. In one exemplary embodiment, the capacitive sensor fixes the functionality to the function indicated in the display. In this embodiment, a tactile input applied to any key, whether the correct key, multiple keys, or a single incorrect key, results in activating the function indicated in the display as a result of the capacitive input.

12 Claims, 7 Drawing Sheets

(56) References Cited

OTHER PUBLICATIONS

International Preliminary Report on Patentability for corresponding Application No. PCT/US2008/051131 dated Oct. 14, 2009.

* cited by examiner

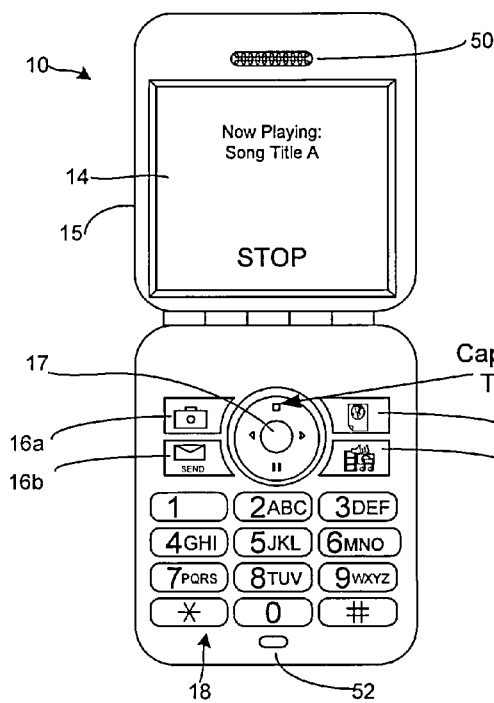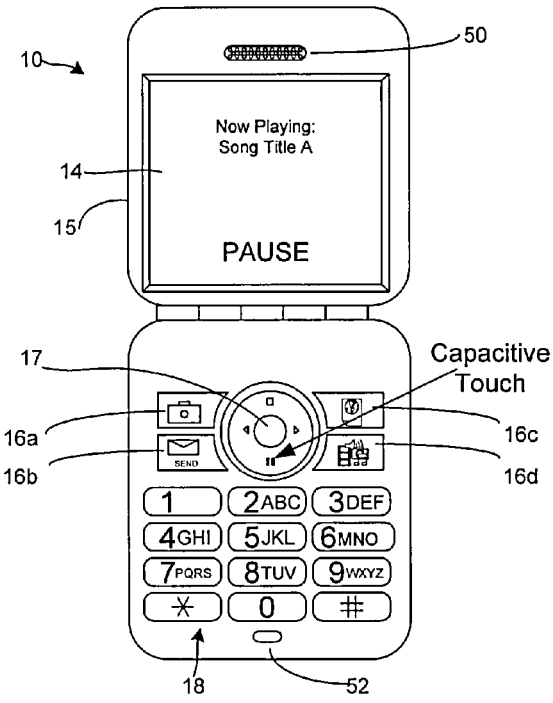

USER INTERFACE WITH ENLARGED ICON DISPLAY OF KEY FUNCTION

TECHNICAL FIELD OF THE INVENTION

The technology of the present disclosure relates generally to a user interface of a portable electronic device such as a mobile telephone, and more particularly to a user interface that displays enlarged icons or symbols corresponding to key functions.

DESCRIPTION OF THE RELATED ART

User interfaces of current portable electronic devices may be inconvenient for certain users. As such devices have become smaller, many features may be difficult to access, particularly for those who may be visually impaired or lack the manual dexterity suitable for operating the small devices.

Portable electronic devices, such as mobile telephones, media players, personal digital assistants (PDAs), and others, are ever increasing in popularity. To avoid having to carry multiple devices, portable electronic devices are now being configured to provide a wide variety of functions. For example, a mobile telephone may no longer be used simply to make and receive telephone calls. A mobile telephone may also be a camera, an Internet browser for accessing news and information, an audiovisual media player, a messaging device (text, audio, and/or visual messages), a gaming device, a personal organizer, and have other functions as well.

Even with the increase of functionality, the physical size of portable electronic devices has been shrinking to provide better portability. As the overall physical size of portable electronic devices has decreased, the size of their input devices, such as numeric keypad buttons, have in some cases decreased commensurately. Although some users may desire small input devices for increased portability, the small size may present obstacles for other users.

Users who are visually impaired may have difficulty seeing the details contained on the small keys or buttons. Although many portable electronic devices contain a conventional numeric keypad as may be found on a telephone, keypads on portable electronic devices commonly include additional keys or buttons associated with the various functional capabilities of the device. These functional keys often contain text or icons that may be difficult for a visually impaired person to read.

To aid visually impaired persons, various attempts have been made to improve the visibility of the functions of portable electronic devices. For example, magnifying tools have been used, but such tools are inconvenient because they may occupy one of the user's hands and require the user to carry an additional object. Displays may have large font capabilities or permit altering the screen resolution to provide larger icons. Although altering a display in this manner may be beneficial for electronic devices having larger displays, such as personal computers, the small screen sizes of displays typical of portable electronic devices limits the usefulness of enlarging a substantial amount of displayed information.

Touch-sensitive screens also have been use as an alternative to key button input devices. As with other display alterations, however, the small screen sizes common of the displays of portable electronic devices may limit the usefulness of a touch screen. In essence, it may be difficult to provide a touch screen with input surfaces of a size meaningfully larger than the surfaces of typical keypad buttons.

Users who lack manual dexterity in the hands or fingers also may have difficulty using the small key buttons commonly found on portable electronic devices. A lack of dexterity may be present in elderly users, as well as those who may have suffered injuries or ailments that have impaired the hands or fingers. Persons with large hands or fingers relative to the size of a portable electronic device also may lack sufficient dexterity for using small key buttons or small touch screens. For such users, pressing multiple keys at once, and/or pressing the wrong key, may result in activating a function that is not desired.

Capacitive sensitive input devices are known in the art and have been used in attempts to enhance the ease of use of input devices. Capacitive input devices may be equipped with electronic capacitive sensors, which can sense when a finger, stylus, or other input instrument is proximate to or touches an input key or button. This permits the user to apply an input with a "capacitive touch", which does not require an actual tactile press of a button. The use of capacitive sensors, however, still has not proven sufficient. With the ever increasing functionality of electronic devices, capacitive sensors as typically used do not aid the user in ascertaining the various functions associated with particular keys. In addition, capacitive sensors have not been known to adequately aid non-dexterous users because the user typically still must press the correct button (or touch screen surface).

SUMMARY

To improve the consumer experience with portable electronic devices, there is a need in the art for an improved user interface that overcomes the difficulties associated with small input devices. Exemplary embodiments of the present invention combine the use of capacitive sensors with tactile sensors in a manner that improves over prior input devices. When a user places a finger, stylus, or other input instrument near a given key button, a capacitive sensor causes the display to display temporarily an indication of the function of that key in an enlarged format. A user, therefore, obtains an enhanced display of the key function and thus a more visible display of device functionality. The user may then press the associated key button to activate the desired function.

In one exemplary embodiment, the capacitive sensor fixes the functionality to the function indicated in the display. In this embodiment, as with the first embodiment, when a user places a finger, stylus, or other input instrument near a given key, a capacitive sensor causes the display to display an indication of the function of that key temporarily and in an enlarged format. The device effectively locks into the function indicated in the display. A tactile input applied to any key, whether the correct key, multiple keys, or a single incorrect key, results in activating the function indicated in the display. In this manner, a non-dexterous user may avoid the inconvenience of activating an undesired function by pressing the wrong key or keys.

In one embodiment, there may be dual level proximate sensors, such as capacitive sensors, such that one level of proximate sensing causes the display to display an indication of the function of the proximately sensed key, and another level of proximate sensing of the same key results in activating the function indicated in the display.

In another embodiment there may be dual level tactile sensors, such as tactile pressure sensitive switches, such that one level of tactile sensing causes the display to display an indication of the function of the tactile pressure sensing switch, and another level of tactile sensing of the same tactile pressure sensing switch results in activating the function indicated in the display.

Therefore, according to one aspect of the invention, a user interface for use in an electronic device includes a display, an input device having a plurality of keys wherein each of the plurality of keys includes a proximate sensor for receiving a proximate input and a tactile sensor for receiving a tactile input, and a controller wherein the controller is configured to receive a proximate input of a given one of the plurality of keys, and upon receiving the proximate input, the controller causes the display to display an enlarged indication of the function of the given one of the plurality of keys, and wherein the controller is further configured to receive a tactile input from at least one of the plurality of keys, and upon receiving the tactile input, the controller causes the electronic device to carry out the function indicated on the display.

According to one embodiment of the user interface, the controller causes the electronic device to carry out the function indicated on the display when the tactile input is received from a key different from the key from which the proximate input was received.

According to one embodiment of the user interface, the controller causes the electronic device to carry out the function indicated on the display when the tactile input is received from multiple keys simultaneously.

According to one embodiment of the user interface, the controller causes the electronic device to carry out the function indicated on the display when the tactile input is received from a key that is the same as the key from which the proximate input was received.

According to one embodiment of the user interface, the proximate sensor of each of the plurality of keys is a capacitive sensor for receiving a capacitive input.

According to one embodiment of the user interface, the keys are keypad buttons.

According to one embodiment of the user interface, the keys are touch screen surfaces.

According to one embodiment of the user interface, the proximate sensor is configured to receive the proximate input from a stylus.

According to one embodiment of the user interface, the electronic device is configured to operate in a plurality of modes, and the controller is further configured to cause the display to display an enlarged indication of the function of the proximate input key in a current mode of operation.

According to one embodiment of the user interface, the controller is further configured to cause the display additionally to display an indication of the current mode of operation of the electronic device.

According to one embodiment of the user interface, the electronic device is a mobile telephone.

According to another aspect of the invention, a method of activating a function in an electronic device includes the steps of receiving a proximate input from a key on the electronic device, displaying an enlarged indication of the function of the key for which the proximate input was received, receiving a tactile input from at least one key on the electronic device, and carrying out the function indicated on the display.

According to one embodiment of the method, the method further includes the step of locking into the function indicated in the display, and wherein the proximate input key and the tactile input key are different keys.

According to one embodiment of the method, the method further includes the step of locking into the function indicated in the display, and wherein the tactile input is received from multiple keys simultaneously.

According to one embodiment of the method, the proximate input key and the tactile input key are the same key.

According to one embodiment of the method, the proximate input is a capacitive input.

According to one embodiment of the method, the electronic device has a plurality of modes of operation, and the displaying step comprises displaying an enlarged indication of the function of the proximate input key in a current mode of operation.

According to one embodiment of the method, the displaying step further comprises additionally displaying an indication of the current mode of operation.

According to one embodiment of the method, the enlarged indication is an icon.

According to one embodiment of the method, the enlarged indication is text.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

BRIEF DESCRIPTION OF THE DRAWINGS

FIGS. 5A-B, 6A-B, 7A-C, and 8A-C depict exemplary uses of a user interface in accordance with embodiments of the present invention with the mobile telephone of FIG. 1.

DETAILED DESCRIPTION OF EMBODIMENTS

Figure 1:
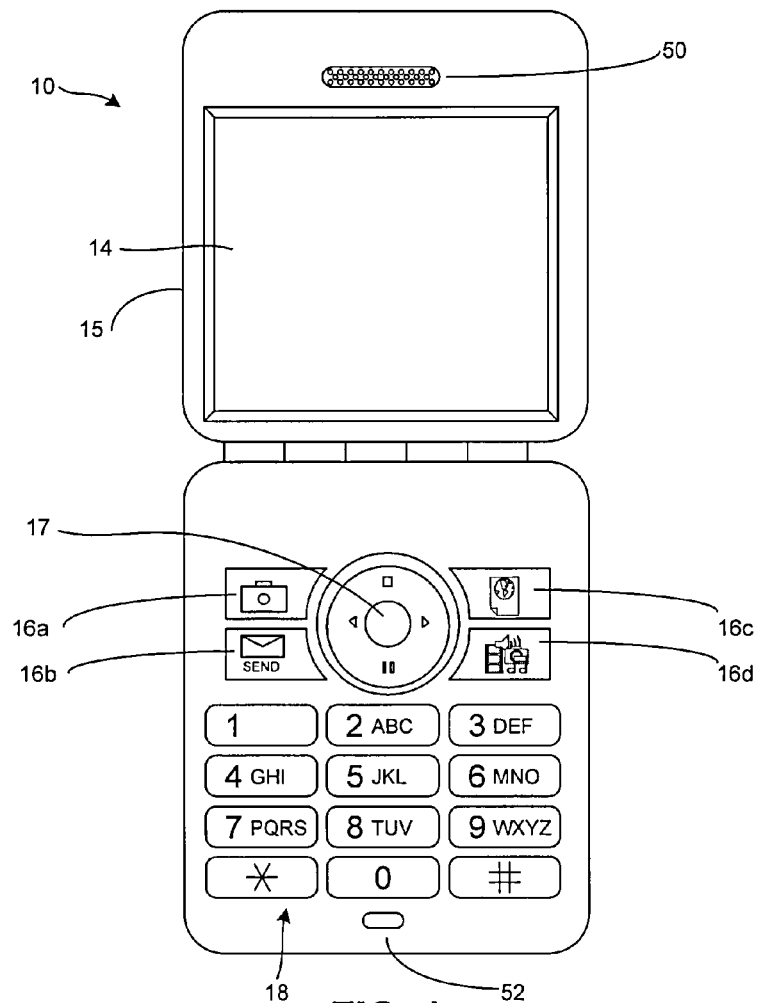
FIG. 1 is a schematic view of a mobile telephone as an exemplary electronic device for use in accordance with an embodiment of the present invention.

An exemplary embodiment of the present invention provides a user interface on a portable electronic device having an input device and a display. The user interface improves the visibility of device functionality for the user (and for a visually impaired user in particular). The user interface also reduces the potential for activating an undesired function by accidentally pressing incorrect or multiple keys, as may be of particular concern to a non-dexterous user.

The input device of the user interface may be a keypad input with dual-input key buttons. Although the invention is described with respect to an exemplary embodiment in which the input device uses keypad buttons, other input devices may be employed. For example, the input device may include keys that are flat touchpad surfaces, or the input device may include keys provided on a touch screen surface. Of the dual inputs, one input is a capacitive input that may sense a finger, stylus, or other instrument proximate to or touching the key button. The other input is a tactile input that responds to physical pressing of the key button.

In one exemplary embodiment, the user interface of the present invention may improve the visual identification of the functionality of the input keys. Such improvements may be useful for those who are visually impaired, or for those who simply prefer an enhanced visual depiction of device functionality. When a user moves a finger, stylus, or other input instrument near a given key button, a capacitive sensor responds thereby creating a capacitive input. The capacitive input causes the display to display an icon, text, or symbol indicating the function of that key. The displayed indication is enlarged to a substantial portion of the display so as to be conveniently visible to the user.

The user may activate the indicated function by pressing the associated key button. If a user does not do so, but instead moves the finger or input instrument proximate a different key button, the display then displays an enlarged icon, text, or symbol indicating the function of the newly selected key button. The user may repeat the operation of displaying various key functions until the desired key and function are located. Once the desired key and function are located, the user may administer a tactile input by pressing the key button to activate the function associated with the displayed icon, text, or symbol.

In one exemplary embodiment, the user interface may improve the ease with which one may select a desired function by preventing accidental selection of an undesired function. Such improvements may be useful for those who may lack sufficient manual dexterity, like certain elderly or injured for example, for operating the small input key buttons on a typical portable electronic device. In this exemplary embodiment, when a capacitive input is sensed and a key function icon, text, or symbol is displayed, the portable electronic device effectively locks into the function indicated on the display. Accordingly, the indicated function is activated even if one or more different, undesired key buttons are pressed inadvertently along with or instead of the original key button corresponding to the function indicated in the display. In other words, if a capacitive input for a key button causes a function indication to be displayed for that key, then a tactile input on any key activates the indicated function corresponding to the capacitive input. In this manner, the desired function may be activated despite an erroneous press of an undesired key button.

The function performed by a key, and as indicated by a displayed icon, text, or symbol, may be fixed for that key at the time of manufacture, or alternatively may be programmed or defined by the user. If a key function is defined by the user, then the user also may define the icon, text, or symbol, to be associated with that key.

In addition, which specific icon, text, or symbol is displayed to indicate the function of a key button may be dependent upon the mode of operation of the portable electronic device, an application currently running on the device, or other input condition of the device. For example, a portable electronic device may have a camera mode of operation. A given key button may act as a "select" button when the device is in a menu selection mode, and the same key button may activate the shutter of the camera when the device is in a camera mode. When a capacitive input is received for that button, the resultant displayed functional indication will depend upon the state or mode of operation of the device. For example, if the device is in a menu selection mode, the capacitive input may result in the display of a "select" icon or symbol, whereas if the device in is in a camera mode, a "take picture" symbol or icon may be displayed.

Embodiments of the present invention will now be described with reference to the drawings, wherein like reference numerals are used to refer to like elements throughout. It will be understood that the figures are not necessarily to scale.

The following description is made in the context of a conventional mobile telephone. It will be appreciated that the invention is not intended to be limited to the context of a mobile telephone and may relate to any type of appropriate portable electronic device, examples of which include a media player, a gaming device, or a computer. For purposes of the description herein, the interchangeable terms "electronic equipment" and "electronic device" also may include portable radio communication equipment. The term "portable radio communication equipment," which sometimes hereinafter is referred to as a "mobile radio terminal," includes all equipment such as mobile telephones, pagers, communicators, electronic organizers, personal digital assistants (PDAs), smartphones, and any portable communication apparatus or the like.

FIG. 1 depicts an exemplary mobile telephone 10. Mobile telephone 10 may be a clamshell phone with a flip-open cover 15 movable between an open and a closed position. In FIG. 1, the cover is shown in the open position. It will be appreciated that mobile telephone 10 may have other configurations, such as a "block" or "brick" configuration.

Figure 2:
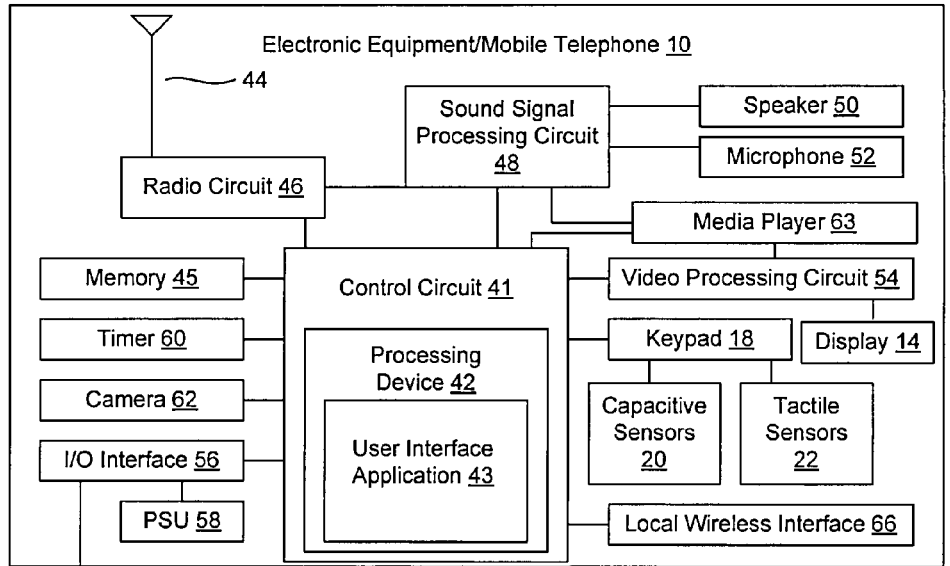
FIG. 2 is a schematic block diagram of operative portions of the mobile telephone of FIG. 1.

FIG. 2 represents a functional block diagram of the mobile telephone 10. The mobile telephone 10 may include a user interface application 43 for carrying out the features of the invention. Application 43 may be embodied as executable program code that is resident in and executed by the mobile telephone 10. The mobile telephone 10 may include a controller that executes the program code stored on a computer or machine-readable medium. The controller may include a control circuit 41 and/or a processing device 42. The program may be a stand-alone software application or form a part of a software application that carries out additional tasks related to the mobile telephone 10.

Mobile telephone 10 has a display 14 viewable when the clamshell telephone is in the open position. The display 14 displays information to a user regarding the various features and operating state of the mobile telephone 10, and displays visual content received by the mobile telephone 10 and/or retrieved from a memory 45 (FIG. 2). Also, the display 14 may be used as an electronic viewfinder for a camera assembly 62.

A keypad 18 provides for a variety of user input operations. For example, keypad 18 typically includes alphanumeric keys for allowing entry of alphanumeric information such as telephone numbers, phone lists, contact information, notes, etc. In addition, keypad 18 typically includes special function keys such as a "send" key for initiating or answering a call. As further described below, special function keys also may include menu navigation and select keys to facilitate navigating through a menu displayed on the display 14. Some or all of the keys may be used in conjunction with the display as soft keys. Keys or key-like functionality also may be embodied as a touch screen associated with the display 14.

As shown in FIG. 2, mobile telephone 10 also may include capacitive sensors 20. The capacitive sensors 20 are in communication with the keypad 18. When a user places a finger, stylus, or other input instrument near a key button on keypad 18, the capacitive sensors sense the presence of the finger/input instrument. In one embodiment, the capacitive sensors are activated when the finger/input instrument is placed in close proximity to a key button. The capacitive sensors thus may be short-range sensors configured to have the sensitivity to distinguish the precise key button about which a finger/input instrument is near. In another embodiment, the capacitive sensors may be activated when a finger/input instrument touches (but does not press) a given key button.

Although the use of capacitive sensors is described as an exemplary embodiment, other short-range or touch sensors may be employed. All sensors of this type are referred to herein collectively as "proximate sensors". Proximate sensors are sensors that may detect when a finger, stylus, or other input instrument is proximate to or touching, but not pressing, a keypad button, which commensurately may be referred to herein as a "proximate input". In addition to capacitive sensors, other examples of proximate sensors may include magnetic, light, acoustic, or inductive sensors.

Mobile telephone 10 also may include tactile sensors 22. The tactile sensors 22 are in communication with the keypad 18. The tactile sensors sense when a tactile input is applied, such as by pressing (and not merely touching) a button on keypad 18.

Figure 3:
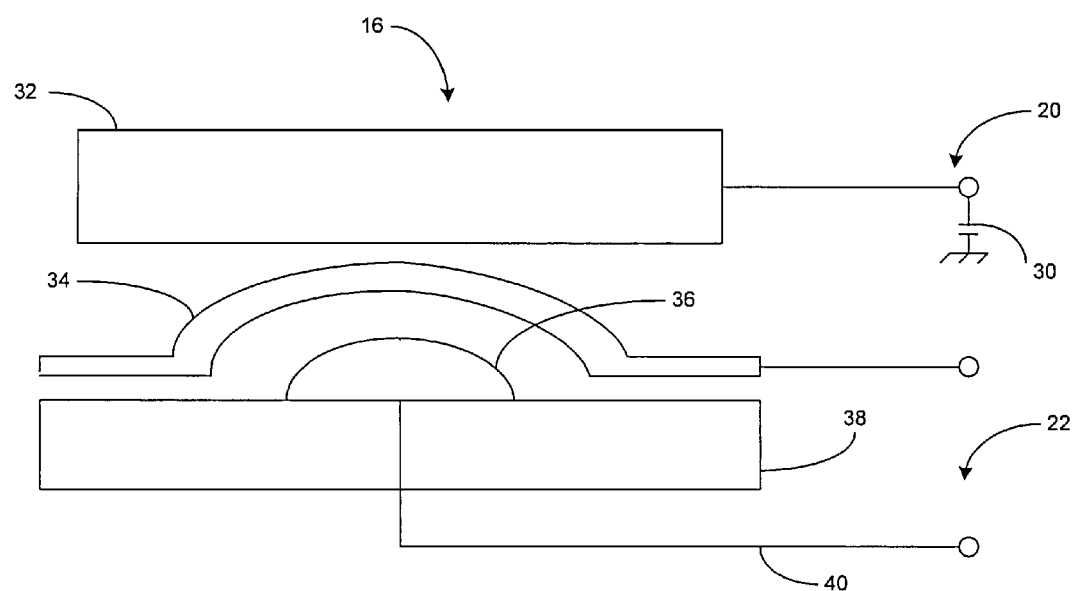
FIG. 3 is a schematic view of an exemplary dual-input key button that may be used as an input device in the mobile telephone of FIG. 1.

FIG. 3 depicts an exemplary dual-input key button 16 that may be used as a button on keypad 18. The key button 16 may include a button surface 32 that the user may touch, press, or otherwise deliver a proximate input with a finger, stylus, or other input instrument. As one of the dual inputs, the key button surface 32 may be associated with one of the capacitive sensors 20 that includes capacitive circuitry 30. The capacitive circuitry 30 may detect a change in capacitance when a finger or other input instrument is near or touches the button surface 32, thereby producing a proximate capacitive input.

As the second of the dual inputs, button surface 32 also may be associated with a tactile sensor 22. When the button is pressed, the button surface 32 depresses a conductive surface 34 made of a conductive material as is known in the art. When depressed, the conductive surface 34 meets electrical contact 36 mounted on a circuit board 38. Electrical leads 40 complete a circuit to create an electrical input in response to a tactile press of a keypad button on keypad 18.

Figure 4:
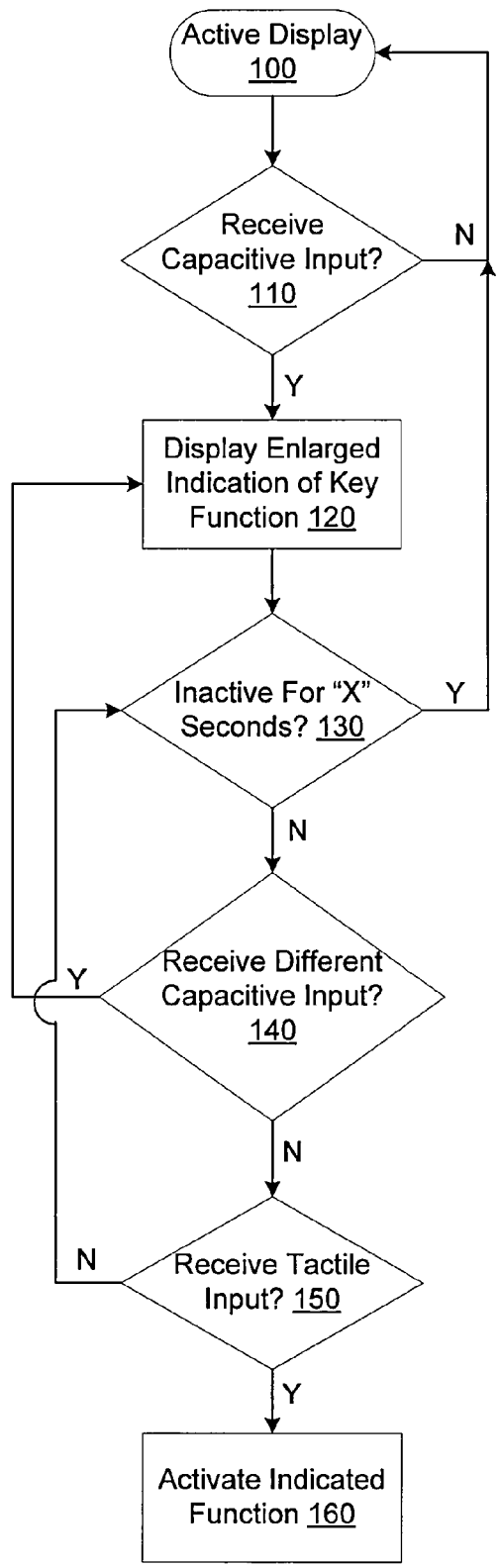
FIG. 4 is a flowchart depicting an exemplary method that may be used in accordance with an embodiment of the present invention.

FIG. 4 depicts an exemplary method of employing a user interface in accordance with an embodiment of the present invention. The exemplary method results in enhanced visibility of key functionality that may benefit those who are visually impaired or simply prefer an enhanced display. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

At step 100, mobile telephone 10 is displaying its active display. The active display may be the display when the mobile telephone is in a given state or mode of operation, such as the display when the phone is initially turned on, after a call is concluded, etc. In essence, the active display corresponds to the display in the current state or mode of operation of the mobile telephone, from which the user may access the various telephone features. At step 110, the capacitive sensors 20 sense for a "capacitive touch" on one of the key buttons on keypad 18. As stated above, a capacitive touch may occur when a finger or input instrument is sufficiently proximate to a key button to be sensed by the capacitive sensors, or alternatively when a key button is touched but not pressed. If a capacitive input is sensed, then at step 120 an enlarged indication of the function of the sensed key button may be displayed on the display 14. The indication may be an icon, text, or symbol indicative of the function of the corresponding key button for which the capacitive input was sensed. In one embodiment, key function and/or the corresponding indication may be preset at the time of manufacture. In another embodiment, one or more key functions and/or corresponding indications may be defined or programmed by the user.

The user may have several options at this stage. Step 130 represents an exemplary "time out" feature. If the user takes no action within a given "x" number of seconds, then the method may simply return to the beginning, and the active display is again displayed on display 14. At step 140, the user may input a new capacitive input by moving a finger or input instrument to a different key, at which point the method returns to step 120. The capacitive input for the new key causes an enlarged indication (icon, text, or symbol) to be displayed corresponding to the function of the new key.

Once the user finds the desired function, at step 150 the user may employ a tactile input to activate the function indicated in the display. (If no tactile input is received, the method may return to the "time out" step 130). The tactile sensors 22 detect the tactile input, which may be applied by pressing the appropriate key button with a finger, stylus, or other input instrument. At step 160, the mobile telephone may activate the function indicated in the display in response to the tactile input.

FIGS. 1 and 5-8 illustrate exemplary uses of an electronic device and the described method with respect to various functions. It will be appreciated that variations of these examples may be employed, and other functions may be activated in a similar manner, without departing from the scope of the invention.

Referring to FIG. 1, the exemplary mobile telephone 10 may include functional keys 16a-d that each correspond to a different function of the mobile telephone. In this example, each function is indicated by an icon and may be accessed with the corresponding key button. For example, mobile telephone 10 may have functional key buttons to activate a camera (16a), email function (16b), web browser (16c), and media player (16d). It will be appreciated that alternative or additional functional keys may be employed. In addition, functional keys may be preset by the manufacturer, or programmed by the user as is conventional. Mobile telephone 10 also may include a five-way navigational surface 17, which may perform a variety of navigational and input functions as are further described below.

Figure 5A:
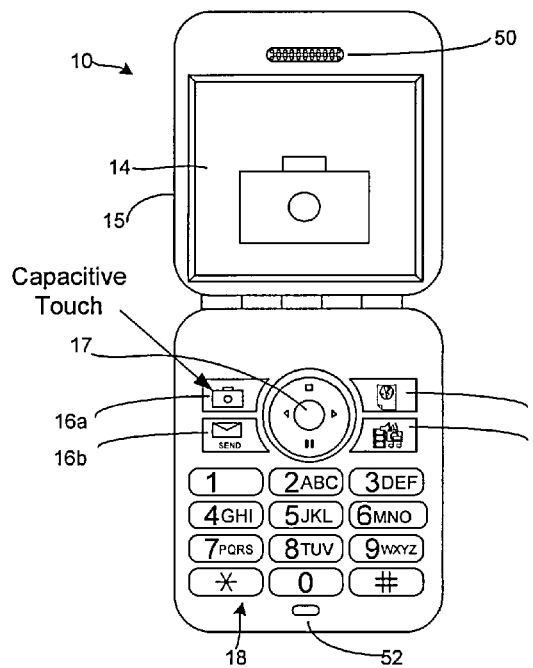

FIG. 5A depicts the mobile telephone 10 in an exemplary situation in which the user has applied a capacitive input to the camera function key 16a. As depicted, a camera icon is displayed in display 14, in an enlarged format, to indicate that the camera function is associated with key 16a. As shown, the displayed camera icon may occupy a substantial portion of the display. In this manner, a user who desires to activate the camera function can be confident that the correct function key has been located. The user may now place the mobile telephone into a camera mode of operation by applying a tactile input, i.e. by pressing the camera key button 16a.

Figure 5B:
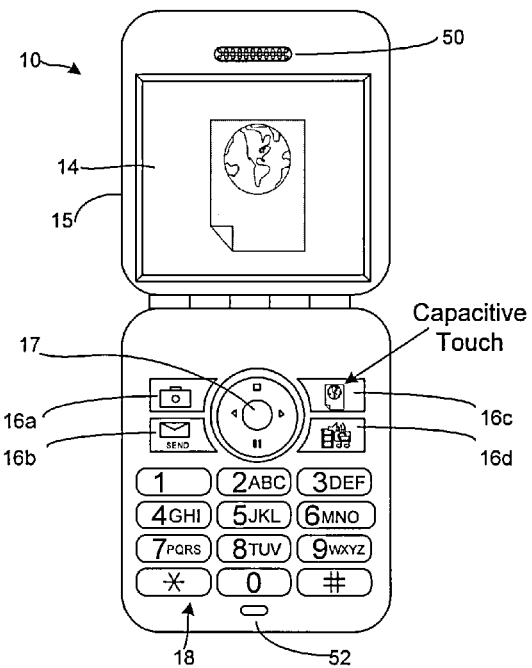

FIG. 5B depicts the mobile telephone 10 in an alternative exemplary situation in which the user has applied a capacitive input to the web browser function key 16c. Display 14 now displays an enlarged icon indicative of the web browser function. The user may have applied a capacitive input to key 16c initially, or by moving a finger/input instrument from a different key, such as camera function key 16a. In this manner, FIGS. 5A and 5B may represent successive displays as the user moves the input instrument from function key 16a to function key 16c.

Certain key buttons may possess multiple functions. For example, email function key 16b also may act as the "send" key to initiate or accept a telephone call in a calling mode of operation. In one embodiment, the displayed icon resulting from a capacitive input is dependent upon the current state or mode of operation of the mobile telephone 10.

Figure 6A:
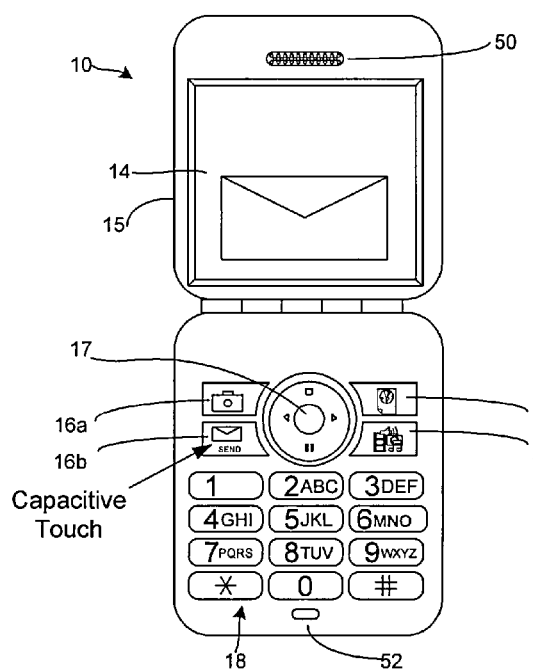
Figure 6B:
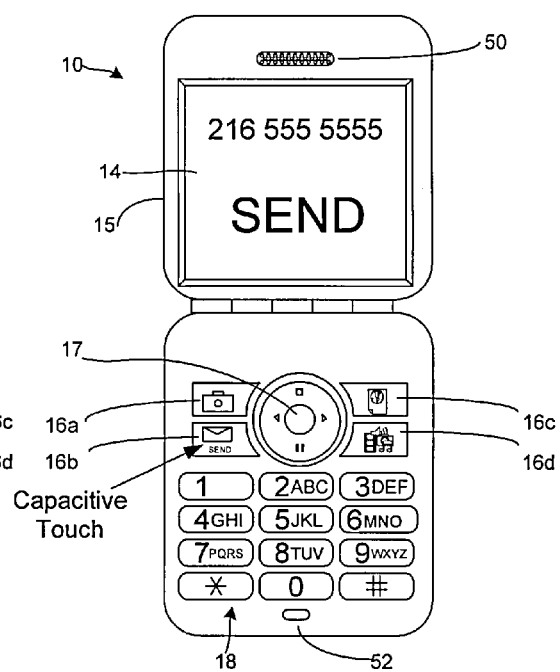

For example, FIG. 6A corresponds to an exemplary situation in which the mobile telephone 10 is in a "static" mode of operation, meaning that no particular function is currently accessed. As depicted, the user has applied a capacitive input to the email/send key 16b. Because the mobile telephone is not in a calling mode, display 14 displays an enlarged email icon, which permits the user to activate the email function. In contrast, in FIG. 6B the user has entered a telephone number, as depicted in display 14 of the figure. The mobile telephone 10, therefore, is in a calling mode of operation, and a capacitive input applied to the email/send key now results in the enlarged text "send" being displayed on display 14.

In another embodiment, the display may indicate the mode of operation of the electronic device as well as key function. For example, the phrase "calling mode" may be displayed in conjunction with the "send" function, so as to indicate both the current mode of operation of the mobile telephone and the function of the selected key in such mode.

FIGS. 7A-C and 8A-C depict other examples of the user interface in the case of using multiple function keys. As stated above, mobile telephone 10 may include a five-way navigational surface 17. The navigational surface may permit a user to navigate through various menus that may be displayed on display 14, as is conventional. The navigational surface also may act as controls for a media play 63 (FIG. 2), which may be activated using a media player key 16d.

Figure 7A:
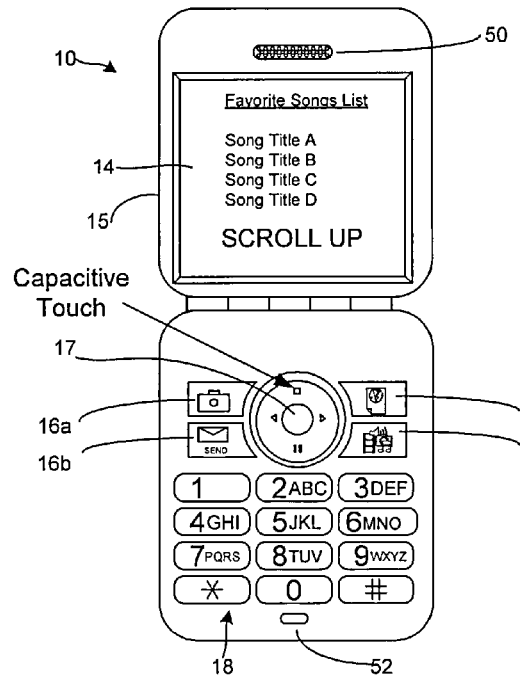
Figure 7B:
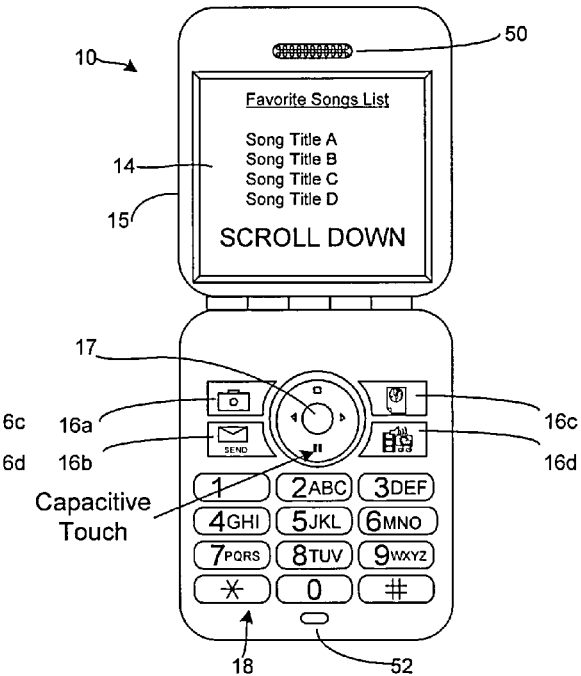
Figure 7C:
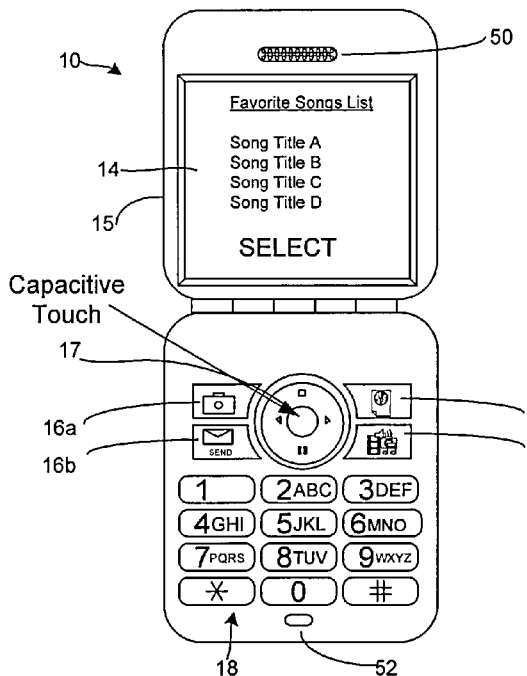

In the examples of FIGS. 7A-C, the media player function has been opened, and a "Favorite Songs" list is displayed. In such a "menu" mode of operation, the five-way navigational surface 17 permits various navigation operations in the displayed menu. A capacitive input may cause a given navigation function to be indicated in display 14. For example, as depicted in FIGS. 7A and 7B, scroll up and scroll down functions may be indicated by applying a capacitive input to the appropriate locations of the five-way navigational surface 17. As shown in FIG. 7C, a center button may act as a "select" key. In this embodiment, the function is indicated in the display in an enlarged form, but also in a manner that does not significantly interfere with the visibility of the menu. A user may activate one of the navigation functions by applying a tactile input to the appropriate location on the five-way navigational surface 17.

Figure 8A:
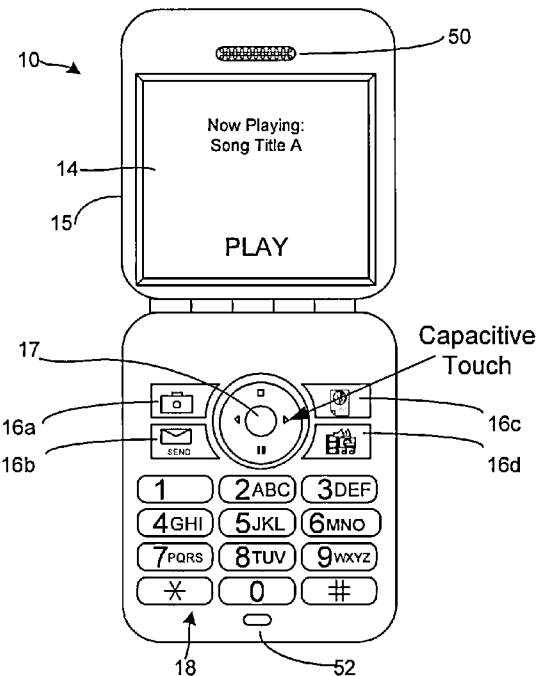

In the examples of FIGS. 8A-C, "Song Title A" is being played by the media player, as indicated in display 14. Now, the navigational surface 17 may act as the media player controls. A capacitive input may cause a given media control to be indicated on display 14, such as "play" (FIG. 8A), "stop" (FIG. 8B), or "pause" (FIG. 8C). As before, a user may activate one of the media player functions by applying a tactile input to the appropriate location on the five-way navigational surface 17.

Other exemplary multi-function keys may be employed. For example, in a calling mode, a capacitive input applied to a numeric key may result in the display of an enlarged indication of the corresponding number for that key (the number "2" for example). In a text messaging mode, a capacitive input applied to a numeric key may result in the display of an enlarged indication of the corresponding letters for that key (the letters "ABC" for the "2" key, for example). In addition, the user may define or program key functions. For example, if an exemplary mobile telephone did not have a dedicated email button, the user may program a numeric (or other) key to be dedicated for the email function. A user also may be able to select an icon of choice to be associated with the email function. Other examples of creating and employing multi-function keys may be devised without departing from the scope of the invention.

In each of the above examples, a particular function or operation may be activated by administering a tactile input on (i.e., pressing) the key button corresponding to the desired function that was indicated in the display by virtue of the capacitive input. Again, these examples are not meant to limit the scope of the invention, and variations may be employed without departing from the scope thereof.

Those with impeded manual dexterity, either because of age, injury, or otherwise, sometimes may have difficulty operating the small sized keys or buttons common on portable electronic devices. Pressing more than one key button at once, or pressing the wrong key button, may result in activation of an undesired function. In one embodiment, the potential for errors in administering the correct tactile input is reduced by having the capacitive input be determinative of the activated function. In this embodiment, a tactile input applied to any key button or combination of key buttons causes the electronic device to activate the function corresponding to the capacitive input.

Figure 9:
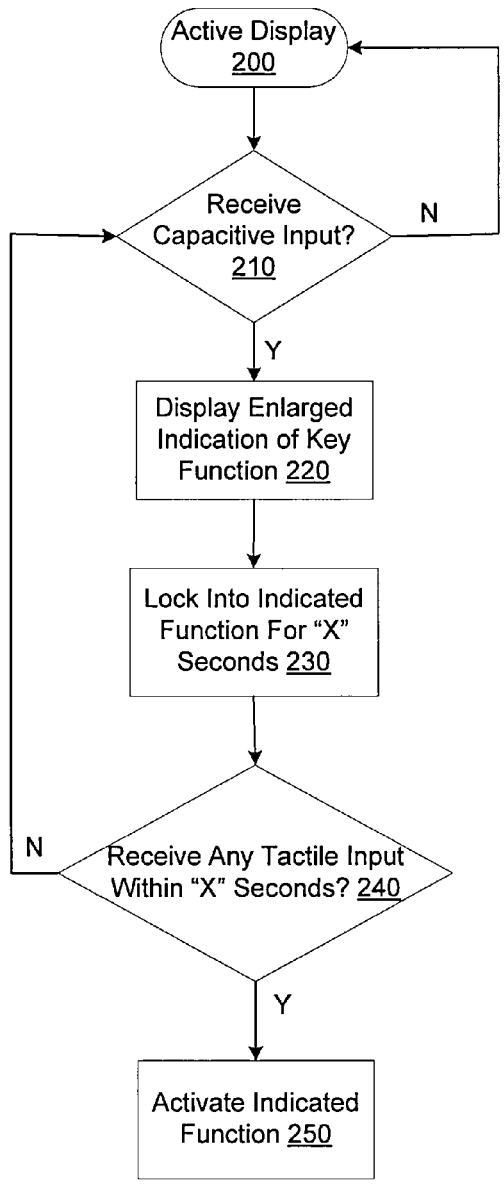
FIG. 9 is a flowchart depicting another exemplary method that may be used in accordance with an embodiment of the present invention.

FIG. 9 depicts an exemplary method of employing a user interface in accordance with an embodiment of the present invention that reduces the likelihood that a non-dexterous user will activate an undesired function. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

Referring to FIG. 9, the method begins similarly to the method of FIG. 4. At step 200, the active display is being displayed, and at step 210, capacitive sensors sense for a capacitive input. If a capacitive input is received, at step 220 an enlarged indication of the key function is displayed. In this exemplary method, at step 230 the device locks into the function indicated in the display for a predetermined "X" number of seconds and awaits a tactile input. At step 240, the method checks for any tactile input. If any tactile input is received within the predetermined number of seconds, then the function indicated in the display is activated at step 250. By checking for any tactile input, the indicated function is activated regardless of whether the tactile input is applied to the correct key, an incorrect key, or multiple keys. If no tactile input is received within the predetermined number of seconds, then the method returns to step 210 to check for another capacitive input.

The lock-in step 230 serves two purposes. First, it prevents a non-dexterous user from activating an undesired function by applying a tactile input to an incorrect key button or buttons. For example, suppose at step 210 a user applies a capacitive input to the camera function key 16a of FIG. 1. At step 220, an enlarged icon corresponding to the camera function may be displayed (see, e.g., FIG. 4A). The device is therefore locked into the camera function at step 230. At step 240, a user desiring to activate the camera function would intend to administer a tactile input to the camera function key 16a. Suppose instead, however, that the user acts without competent dexterity and accidentally presses both the camera function key 16a and the adjacent email function key 16b. Despite the error of pressing both key buttons simultaneously, the camera function is activated in accordance with the capacitive input of step 210. In another embodiment, the camera function would be activated even if an erroneous key button were pressed (say 16b) without providing any tactile input to the correct key 16c. The mobile telephone, therefore, effectively locks into the indicated function in accordance with the capacitive input. In this manner, the potential for errors caused by pressing multiple or erroneous keys is reduced.

A related function of the lock-in step 230 is to preclude administering a new capacitive input to afford the user time to apply a tactile input. For example, suppose again at step 210 that a user applies a capacitive input to the camera function key 16a, and acting without competent dexterity, accidentally moves a finger to press the email function key 16b. Without the lock-in step, the device might first perceive an undesired capacitive input to the email key 16b as the user's finger approaches that key, ultimately resulting in activation of the incorrect function. By locking into the camera function at step 230, a new capacitive input will not be accepted as the user moves a finger to an incorrect key.

The length "X seconds" of the lock-in step may vary, but it preferably should be set long enough to afford a user a reasonable opportunity to apply a tactile input, but not be so long so as to result in an inconvenient delay in permitting a new capacitive input. A lock-in of about one to two seconds may be appropriate to strike this balance. Alternatively, the lock-in may not be for a specific time period. Instead, the device may lock into the capacitive input until the user removes the finger or instrument from proximate to the device, thereby removing fully any capacitive input. The user may then apply a capacitive input anew.

If no tactile input at all is received at step 240, then the method may return to step 210 to check for a new capacitive input. The user may input the same capacitive input, or administer a new capacitive input by moving a finger or input instrument to a new key. If no capacitive input is received, then the device may return to its active display.

Additional features of the mobile telephone 10 will now be described. For the sake of brevity, generally conventional features of the mobile telephone 10 will not be described in great detail herein. The mobile telephone 10 includes call circuitry that enables the mobile telephone 10 to establish a call and/or exchange signals with a called/calling device, typically another mobile telephone or landline telephone, or another electronic device. The mobile telephone 10 also may be configured to transmit, receive, and/or process data such as text messages (e.g., colloquially referred to by some as "an SMS," which stands for short message service), electronic mail messages, multimedia messages (e.g., colloquially referred to by some as "an MMS," which stands for multimedia message service), image files, video files, audio files, ring tones, streaming audio, streaming video, data feeds (including podcasts) and so forth. Processing such data may include storing the data in the memory 45, executing applications to allow user interaction with data, displaying video and/or image content associated with the data, outputting audio sounds associated with the data and so forth.

The mobile telephone 10 may include a primary control circuit 41 that is configured to carry out overall control of the functions and operations of the mobile telephone 10. The control circuit 41 may include a processing device 42, such as a CPU, microcontroller or microprocessor. Among their functions, to implement the features of the present invention, the control circuit 41 and/or processing device 42 may comprise a controller that may execute program code embodied as the user interface application 43. It will be apparent to a person having ordinary skill in the art of computer programming, and specifically in application programming for cameras, mobile telephones or other electronic devices, how to program a mobile telephone to operate and carry out logical functions associated with application 43. Accordingly, details as to specific programming code have been left out for the sake of brevity. Also, while the code may be executed by control circuit 41 in accordance with an exemplary embodiment, such controller functionality could also be carried out via dedicated hardware, firmware, software, or combinations thereof, without departing from the scope of the invention.

The mobile telephone 10 may include an antenna 44 coupled to a radio circuit 46. The radio circuit 46 includes a radio frequency transmitter and receiver for transmitting and receiving signals via the antenna 44 as is conventional. The mobile telephone 10 further includes a sound signal processing circuit 48 for processing audio signals transmitted by and received from the radio circuit 46. Coupled to the sound processing circuit 48 are a speaker 50 and microphone 52 that enable a user to listen and speak via the mobile telephone 10 as is conventional.

The display 14 may be coupled to the control circuit 41 by a video processing circuit 54 that converts video data to a video signal used to drive the various displays. The video processing circuit 54 may include any appropriate buffers, decoders, video data processors and so forth. The video data may be generated by the control circuit 41, retrieved from a video file that is stored in the memory 45, derived from an incoming video data stream received by the radio circuit 48 or obtained by any other suitable method.

The mobile telephone 10 also may include a local wireless interface 66, such as an infrared transceiver and/or an RF adaptor (e.g., a Bluetooth adapter), for establishing communication with an accessory, another mobile radio terminal, a computer or another device. For example, the local wireless interface 66 may operatively couple the mobile telephone 10 to a headset assembly (e.g., a PHF device) in an embodiment where the headset assembly has a corresponding wireless interface.

The mobile telephone 10 also may include an I/O interface 56 that permits connection to a variety of I/O conventional I/O devices. One such device is a power charger that can be used to charge an internal power supply unit (PSU) 58.

Figure 10:
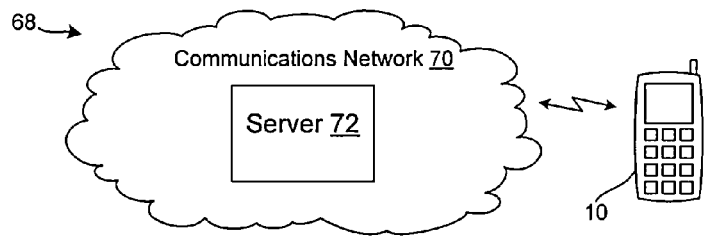
FIG. 10 is a schematic diagram of a communications system in which the mobile telephone of FIG. 1 may operate.

With additional reference to FIG. 10, the mobile telephone 10 may be configured to operate as part of a communications system 68. The system 68 may include a communications network 70 having a server 72 (or servers) for managing calls placed by and destined to the mobile telephone 10, transmitting data to the mobile telephone 10 and carrying out any other support functions. The server 72 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 70 may support the communications activity of multiple mobile telephones 10 and other types of end user devices. As will be appreciated, the server 72 may be configured as a typical computer system used to carry out server functions and may include a processor configured to execute software containing logical instructions that embody the functions of the server 72 and a memory to store such software.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A user interface for use in an electronic device comprising:
   a display; and
   an input device having a plurality of keys, wherein each of the plurality of keys includes a proximate sensor for receiving a proximate input and a tactile sensor for receiving a tactile input; and
   a controller, wherein the controller is configured to receive a proximate input of a given one of the plurality of keys, and upon receiving the proximate input, the controller causes the display to display an enlarged indication of the function of the given one of the plurality of keys; and
   wherein the controller is further configured to receive a tactile input from at least one of the plurality of keys, and upon receiving the tactile input, the controller causes the electronic device to carry out the function indicated on the display regardless of the key from which the tactile input is received.

2. The user interface according to claim 1, wherein the controller causes the electronic device to carry out the function indicated on the display when the tactile input is received from a key different from the key from which the proximate input was received.

3. The user interface according to claim 1, wherein the controller causes the electronic device to carry out the function indicated on the display when the tactile input is received from multiple keys simultaneously.

4. The user interface according to claim 1, wherein the controller causes the electronic device to carry out the function indicated on the display when the tactile input is received from a key that is the same as the key from which the proximate input was received.

5. The user interface according to claim 1, wherein the proximate sensor of each of the plurality of keys is a capacitive sensor for receiving a capacitive input.

6. The user interface according to claim 1, wherein the keys are keypad buttons.

7. The user interface according to claim 1, wherein the keys are touch screen surfaces.

8. The user interface according to claim 1, wherein the proximate sensor is configured to receive the proximate input from a stylus.

9. The user interface according to claim 1, wherein the electronic device is configured to operate in a plurality of modes, and the controller is further configured to cause the display to display an enlarged indication of the function of the proximate input key in a current mode of operation.

10. The user interface according to claim 9, wherein the controller is further configured to cause the display additionally to display an indication of the current mode of operation of the electronic device.

11. The user interface according to claim 1, wherein the electronic device is a mobile telephone.

12. The user interface according to claim 1, wherein the controller is configured to lock into the function indicated in the display for a predetermined amount of time, and during such predetermined time, the controller is configured to carry out the function indicated on the display regardless of the key from which the tactile input is received.

* * * * *